US010205140B2

(12) United States Patent
Chen et al.

(10) Patent No.: US 10,205,140 B2
(45) Date of Patent: Feb. 12, 2019

(54) CELL AND MANUFACTURE METHOD THEREOF (71) Applicant: DELTA ELECTRONICS, INC., Taoyuan Hsien (TW)

(72) Inventors: Chin-Ming Chen, Taoyuan Hsien (TW); Po-Lin Pan, Taoyuan Hsien (TW)

(73) Assignee: DELTA ELECTRONICS, INC., Taoyuan Hsien (TW)

(*) Notice: Subject to any disclaimer, the term of this patent is extended or adjusted under 35 U.S.C. 154(b) by 1145 days.

(21) Appl. No.: 14/289,372

(22) Filed: May 28, 2014

(65) Prior Publication Data

US 2015/0236310 A1 Aug. 20, 2015

Related U.S. Application Data (60) Provisional application No. 61/941,739, filed on Feb. 19, 2014.

(51) Int. Cl.
*H01M 2/04* (2006.01)
*H01M 2/30* (2006.01)
*H01M 2/26* (2006.01)
*H01M 2/08* (2006.01)
*H01M 10/0525* (2010.01)

(52) U.S. Cl.
CPC ......... *H01M 2/043* (2013.01); *H01M 2/0434* (2013.01); *H01M 2/08* (2013.01); *H01M 2/26* (2013.01); *H01M 2/30* (2013.01); *H01M 10/0525* (2013.01); *H01M 2220/20* (2013.01); *Y10T 29/49108* (2015.01)

(58) Field of Classification Search
CPC .................................................. H01M 2/043
See application file for complete search history.

(56) References Cited

U.S. PATENT DOCUMENTS

| 2006/0068281 | A1 | 3/2006 | Hiratsuka et al. |
| 2007/0207380 | A1 | 9/2007 | Tononishi |
| 2009/0197160 | A1* | 8/2009 | Fujiwara ............. H01M 2/18 429/146 |
| 2009/0202912 | A1 | 8/2009 | Baba et al. |

(Continued)

FOREIGN PATENT DOCUMENTS

| CN | 1291797 A | 4/2001 |
| CN | 2783537 Y | 5/2006 |

(Continued)

OTHER PUBLICATIONS

JP2013041788A Original & Translation from Espacenet.*

*Primary Examiner* — Barbara L Gilliam
*Assistant Examiner* — Nathanael T Zemui
(74) *Attorney, Agent, or Firm* — Muncy, Geissler, Olds & Lowe, P.C.>

(57) ABSTRACT

A cell includes a front cover having a front cavity, a rear cover having a rear cavity, a first terminal, a second terminal, and an electrode group. The rear cover is connected to the front cover. The first terminal is disposed on the front cover and passes through the front cover to the front cavity. The second terminal is disposed on the front cover, and passes through the front cover to the front cavity. The electrode group is disposed in the front cavity and the rear cavity, and connected to the first terminal and the second terminal in the front cavity.

12 Claims, 8 Drawing Sheets

(56) References Cited

U.S. PATENT DOCUMENTS

| | | | |
|---|---|---|---|
| 2009/0239136 A1* | 9/2009 | Nagamine | H01M 2/1077 429/148 |
| 2010/0003592 A1 | 1/2010 | Baba et al. | |
| 2011/0052976 A1 | 3/2011 | Ishii et al. | |
| 2011/0256446 A1* | 10/2011 | Bronczyk | H01M 2/1077 429/163 |
| 2012/0258352 A1* | 10/2012 | Hong | H01M 2/0217 429/163 |
| 2014/0030562 A1 | 1/2014 | Ishii et al. | |

FOREIGN PATENT DOCUMENTS

| | | | |
|---|---|---|---|
| EP | 1 071 147 A1 | | 1/2001 |
| EP | 2 472 635 A1 | | 7/2012 |
| EP | 2058892 B1 | | 1/2014 |
| JP | S 61116754 A | | 6/1986 |
| JP | 2000294202 A | | 10/2000 |
| JP | 2001167744 A | | 6/2001 |
| JP | 2004006226 A | | 1/2004 |
| JP | 2011040379 A | | 2/2011 |
| JP | 2013041788 A | | 2/2013 |
| JP | 2013041788 A | * | 2/2013 |
| JP | 2015130317 A | | 7/2015 |
| TW | 447157 | | 7/2001 |
| TW | 466790 | | 12/2001 |
| TW | 504854 | | 10/2002 |
| TW | I299921 | | 8/2008 |
| TW | 201203655 A | | 1/2012 |

\* cited by examiner

CELL AND MANUFACTURE METHOD THEREOF

CROSS-REFERENCE TO RELATED APPLICATIONS

This application claims the benefit of U.S. Provisional Application No. 61/941,739, filed on Feb. 19, 2014, the contents of which are incorporated herein for reference.

BACKGROUND OF THE INVENTION

Field of the Invention

The present disclosure relates to a cell, and in particular to a cell having an electrode group covered by two covers.

Description of the Related Art

In general, cells such as prismatic cells are widely used in electronic devices. Recently, large prismatic cells have been used in vehicles, such as electric vehicles or hybrid electric vehicles, for all or a portion of their motive power.

Figure 1:
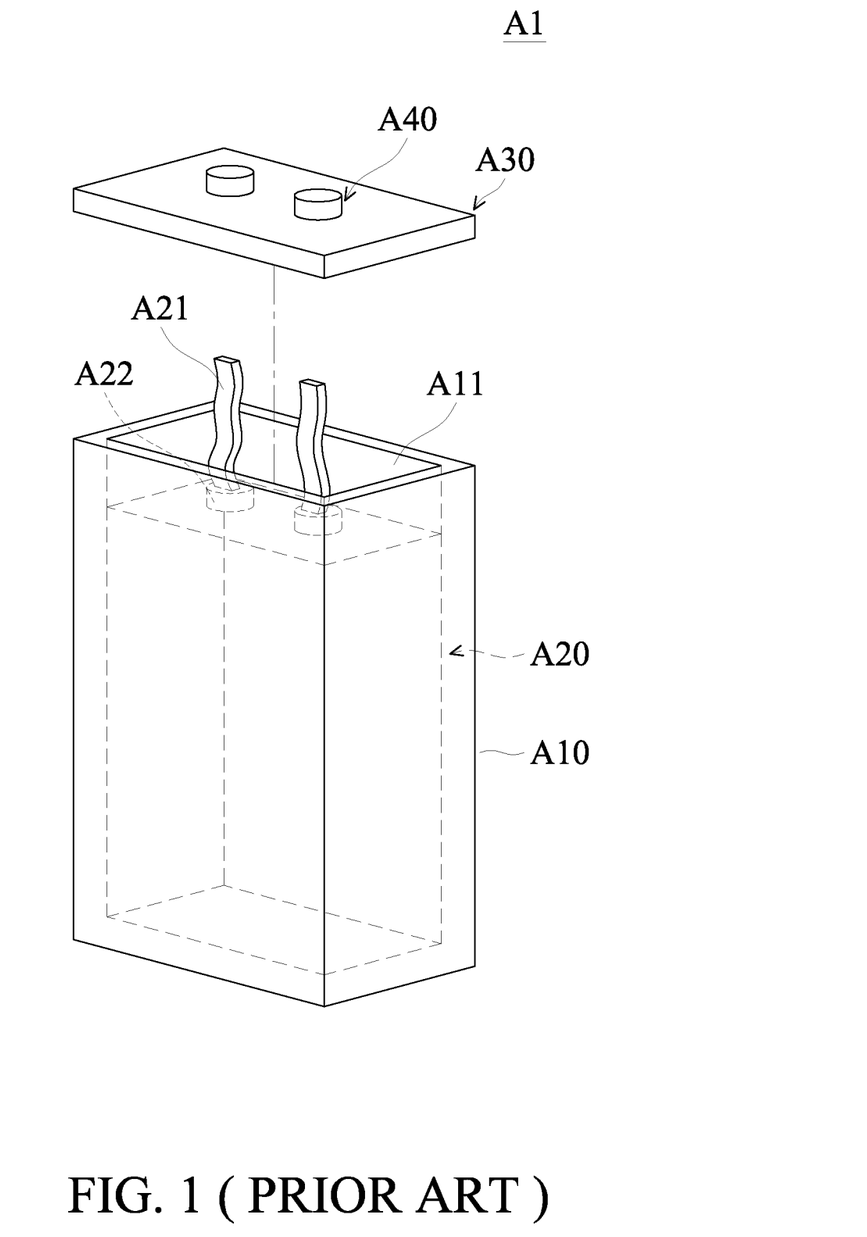
FIG. 1 is a perspective view of a conventional prismatic cell.

A conventional prismatic cell A1 is illustrated in FIG. 1. The large prismatic cell A1 includes a housing A10, an electrode group A20, a top cover A30, and outer electrodes A40. The electrode group A20 is disposed in the housing A10 via an opening A11 of the housing A10. However, the housing A10 is formed as a single piece by an aluminum extrusion process or a stamping process. Since the electrode group A20 is completely located in the housing A10, the opening A11 is very deep. Therefore, the manufacturing of the housing A10 is difficult when the prismatic cell A1 is large in size.

The top cover A30 is for covering the opening A11. Before the top cover A30 is fixed at the housing A10, flexible conductive straps A21 are manually connected to the electrode tabs A22 of the electrode group A20 and the outer electrodes A40 at the top cover A30 by manual. Therefore, the manufacturing time of the prismatic cell A1 is increased.

Furthermore, if the cell capacity of the prismatic cell A1 is increased for design requirements, the thickness of the electrode group A20 increases accordingly. The new housing A10 and top cover A30 with new specifications are required to be manufactured. Therefore, the manufacturing costs of the prismatic cells A1 with different cell capacities are increased.

BRIEF SUMMARY OF THE INVENTION

To solve the problems of the prior art, the present disclosure provides a cell to decrease the manufacturing cost and time of the cell and simplify the manufacture process.

The present disclosure provides a cell that includes a front cover having a front cavity, a rear cover having a rear cavity, a first terminal, a second terminal, and an electrode group. The rear cover is connected to the front cover. The first terminal is disposed on the front cover and passes through the front cover to the front cavity. The second terminal is disposed on the front cover, and passes through the front cover to the front cavity. The electrode group is disposed in the front cavity and the rear cavity, and connected to the first terminal and the second terminal in the front cavity.

The present disclosure provides a manufacture method for a cell includes disposing an electrode group at a front cover; preparing a rear cover having a rear cavity with a depth according to a thickness of the electrode group; and disposing the rear cover at the front cover, wherein the electrode group is located in the rear cavity.

In conclusion, the electrode group of the cell is covered by the front cover and the rear cover, and thus the manufacture of the front cover and the rear cover is simplified. Furthermore, since the electrode group is connected to the terminals before the front cover is fixed at the rear cover, the manufacturing time of the cell is decreased. If the cell capacity of the cell is modified by design, only the height of the side wall of the rear cover may be modified to match the modification by design. Therefore, the manufacturing cost of the cell with different cell capacities is decreased.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following disclosure provides many different embodiments, or examples, for implementing different features of the present disclosure. Specific examples of components and arrangements are described below to simplify the present disclosure. For example, the formation of a first feature over or on a second feature in the description that follows may include embodiments in which the first and second features are formed in direct contact, and may also include embodiments in which additional features may be formed between the first and second features, such that the first and second features may not be in direct contact.

In addition, the shape, size, or thickness in the drawings may not drawn to scale or simplified and have been clarity of discussion, and these drawings are merely intended for illustration.

Figure 2:
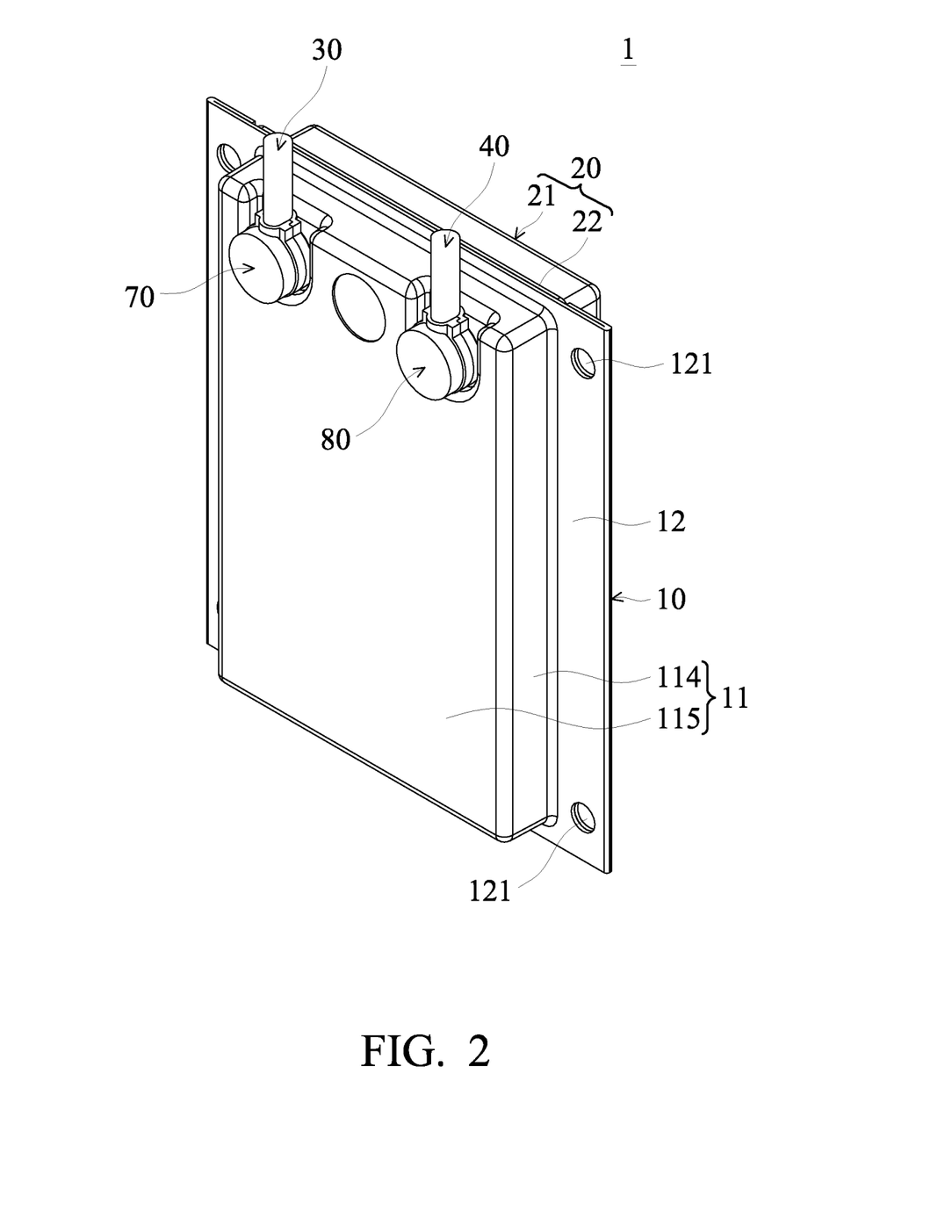
FIG. 2 is a perspective view of a cell in accordance with the present disclosure.
Figure 3:
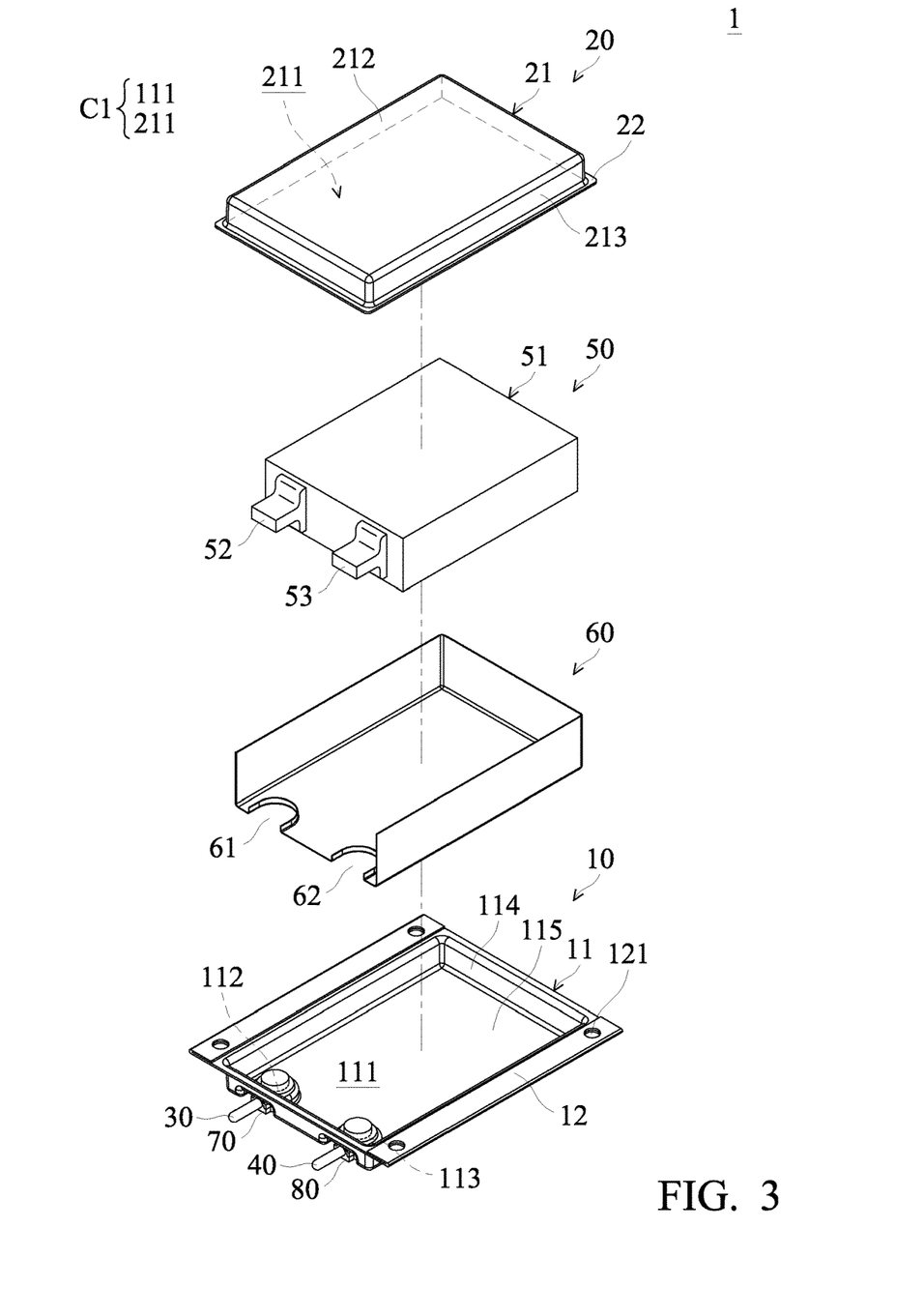
FIG. 3 is an exploded view of the cell in accordance with the present disclosure.
Figure 4:
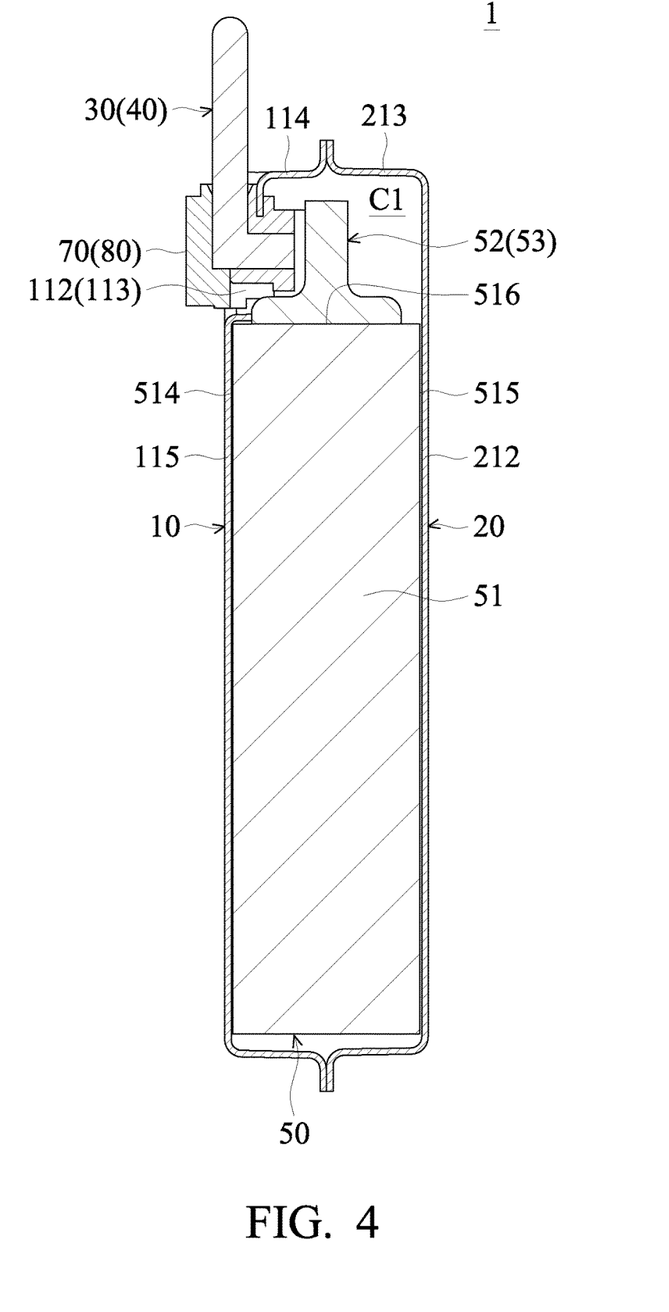
FIG. 4 is a cross-sectional view of the cell in accordance with the present disclosure.

FIG. 2 is a perspective view of a cell 1 in accordance with the present disclosure. FIG. 3 is an exploded view of the cell 1 in accordance with the present disclosure. FIG. 4 is a cross-sectional view of the cell 1 in accordance with the present disclosure. In some embodiments, the cell 1 is a prismatic cell or a cylindrical cell. In some embodiments, the cell 1 is a secondary cell, such as a lead-acid cell, a nickel-cadmium cell, a nickel-hydrogen cell, or a lithium-ion cell.

The cell 1 includes a front cover 10, a rear cover 20, a first terminal 30, a second terminal 40, an electrode group 50, and a retaining frame 60. The front cover 10 is configured to connect to the rear cover 20. The front cover 10 has a front cavity 111, and the rear cover 20 has a rear cavity 211. When the front cover 10 is connected to the rear cover 20, the A receiving chamber C1 is formed by the front cavity 111 and the rear cavity 211.

The first terminal 30 is disposed on the front cover 10. The first terminal 30 passes through the front cover 10 to the front cavity 111. The second terminal 40 is disposed on the front cover 10. The second terminal 40 passes through the front cover 10 to the front cavity 111. In some embodiments, the first terminal 30 is a positive terminal, and the second terminal 40 is a negative terminal. In some embodiments, the first terminal 30 is a negative terminal, and the second terminal 40 is a positive terminal.

The electrode group 50 is disposed in the receiving chamber C1 (the front cavity 111 and the rear cavity 211). The electrode group 50 is connected to the first terminal 30 and the second terminal 40 in the front cavity 111.

The electrode group 50 includes a cell body 51, a first electrode tab 52, and a second electrode tab 53. The first electrode tab 52 is disposed on the cell body 51 and connected to the first terminal 30. The second electrode tab 53 is disposed on the cell body 51, and connected to the first terminal 30. In some embodiments, the first electrode tab 52 and the second electrode tab 53 are T-shaped structures.

For example, the cell 1 is a lithium-ion cell. The cell body 51 includes a number of first electrode membranes, a number of second electrode membranes, and a number of separator membranes. The first electrode membranes, the second electrode membranes, and the separator membranes are overlaid on each other. For example, one of the separator membranes is connected to and located between an adjacent first electrode membrane and an adjacent second electrode membrane.

The first electrode membranes are connected to the first electrode tab 52, and the second electrode membranes are connected to the second electrode tab 53. In some embodiments, the first electrode membranes are anode membranes, and the second electrode membranes are cathode membranes. In some embodiments, the first electrode membranes are cathode membranes, and the second electrode membranes are anode membranes. In particular, various types of cell body 51 can be applied to the present disclosure, and thus the cell body 51 type is limited by the present disclosure.

The retaining frame 60 is configured to retain the cell body 51. In some embodiments, the retaining frame 60 contacts and covers two opposite side surfaces and a front surface of the cell body 51. The retaining frame 60 has a first slot 61 corresponding to the first electrode tab 52 and a second slot 62 corresponding to the second electrode tab 53. The first terminal 30 passes through the first slot 61 to the first electrode tab 52, and the second terminal 40 passes through the second slot 62 to the second electrode tab 53.

As shown in FIGS. 2 to 3, in some embodiments, the front cover 10 further includes a front body 11 and a fixture element 12. The front body 11 has a first hole 112, a second hole 113, a side wall 114 and a bottom wall 115. The first hole 112 and the second hole 113 are coupled to the front cavity 111. The electrode group 50 is located in the front cavity 111, and the rear cover 20 is fixed at the fixture element 12 by welding, or other suitable methods.

In some embodiments, the side wall 114 is a ring structure, and the bottom wall 115 is connected to the side wall 114. In some embodiments, the side wall 114 is substantially perpendicular to the bottom wall 115. The front cavity 111 is formed between the side wall 114 and the bottom wall 115.

The fixture element 12 extends from the side wall 114 of the front body 11, and protrudes from an outer surface of the side wall 114 of the front body 11. In some embodiments, the fixture element 12 is substantially perpendicular to the outer surface of the side wall 114 of the front body 11.

The rear cover 20 further includes a rear body 21 and a welding portion 22. The rear body 21 has a side wall 213 and a bottom wall 212. The electrode group 50 is located in the rear cavity 211. In other words, the first cover covers the rear cavity 211, and the second cover covers the front cavity 111.

In some embodiments, the side wall 213 is a ring structure as shown in FIG. 3, and the bottom wall 212 is connected to the side wall 213. In some embodiments, the side wall 213 is substantially perpendicular to the bottom wall 212. The rear cavity 211 is formed between the side wall 213 and the bottom wall 212.

The welding portion 22 extends from the side wall 213 of the rear body 21, and protrudes from an outer surface of the side wall 213 of the rear body 21. In some embodiments, the welding portion 22 is substantially perpendicular to the outer surface of the side wall 213 of the rear body 21.

In another embodiment, the fixture element 12 extends from the rear body 21, and the welding portion 22 extends from the front body 11 (not shown in figures). The front cover 10 is fixed at the fixture element 12.

Figure 5A:
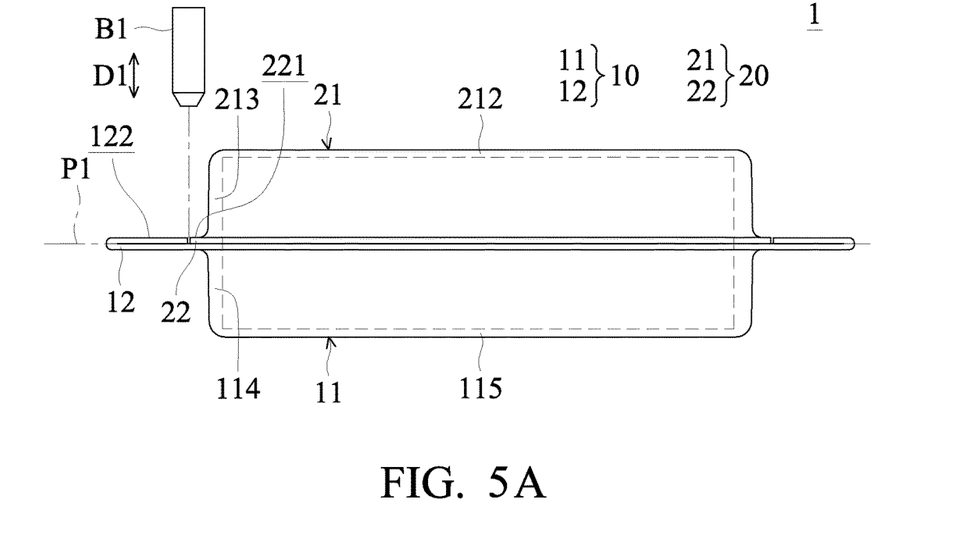
FIG. 5A is a side view of the cell in accordance with the present disclosure.
Figure 5B:
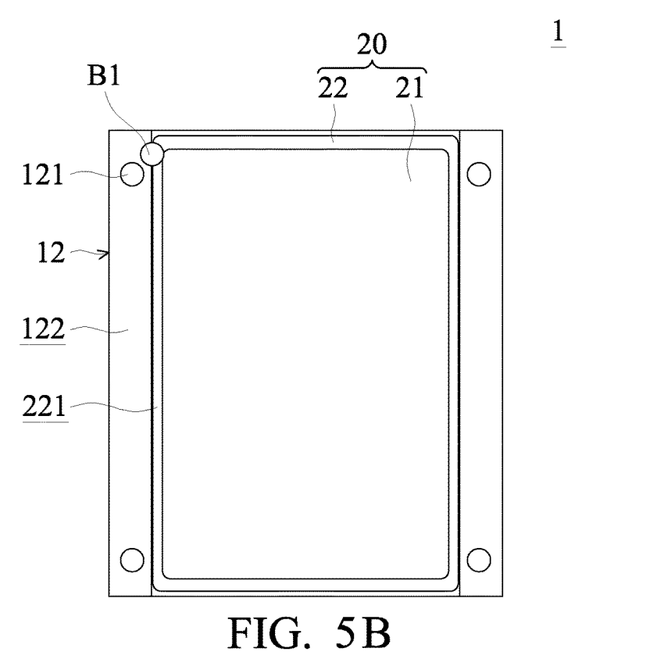
FIG. 5B is a rear view of the cell in accordance with the present disclosure.

In some embodiments, the welding portion 22 is fixed at the fixture element 12 by welding, or other suitable methods. As shown in FIGS. 5A and 5B, the fixture element 12 and the welding portion 22 are extended along a plane P1, such as a horizontal plane P1 in FIG. 5A. The fixture element 12 and the welding portion 22 are ring structures. An area of the fixture element 12 is greater than an area of the welding portion 22.

When the rear cover 20 is disposed on the front cover 10, the fixture element 12 and the welding portion 22 are located at the plane P1. The welding portion contacts a top surface 122 of the fixture element 12, and a portion of the top surface 122 is exposed. Therefore, a welding tool can welding the fixture element 12 and the welding portion 22 along a circular path from a direction D1 at the top surface 122 of the fixture element 12 and at a top surface 221 of the welding portion 22. In some embodiments, the circular path is located at a plane P1 or a horizontal plane along an interface between the fixture element 12 and the welding portion 22. The direction D1 is substantially perpendicular to the plane P1 or a horizontal plane, and the top surface 122 and the top surface 221 faces the same direction. Therefore, the welding process for the combination of the fixture element 12 and the welding portion 22 is easily to process.

As shown in FIGS. 2 to 4 and 5A, the fixture element 12 protrudes from the front cover 10 and the rear cover 20. Therefore, the cell 1 or the front cover 10 can be fixed on a device (not shown) by retaining the fixture element 12.

In some embodiments, for example, the fixture element 12 has a number of fixture holes 121. As shown in FIG. 2, a fastening mechanism (not shown), such as a screw or rod, passes through the fixture hole 121 to fix the cell 1 or the front cover 10 to a device (not shown).

The first terminal 30 passes through first hole 112 to connect to the first electrode tab 52, and extends to the front cavity 111. The second terminal 40 passes through the second hole 113 to connect to the second electrode tab 53, and extends to the front cavity 111.

In some embodiments, the cell 1 further includes a first seal element 70 and a second seal element 80. The first and second seal elements 70 and 80 are disposed on the front cover 10. The first seal element 70 is located in the first hole 112, and the second seal element 80 is located in the second hole 113.

The first seal element 70 is configured to seal a gap between the first terminal 30 and the front body 11, and the second seal element 80 is configured to seal a gap between the second terminal 40 and the front body 11. The first and second seal elements 70 and 80 are made of an elastic material, such rubber. Therefore, the receiving chamber C1 is sealed, and the cell 1 is waterproof.

In some embodiments, the first slot 61 is configured to retain the first seal element 70, and the second slot 62 is configured to retain the second seal element 80. Therefore, the retaining frame 60 is positioned in the front cavity 111 by the first slot 61 and the second slot 62.

As shown in FIG. 4, the electrode group 50 further has a front surface 514, a rear surface 515 opposite to the front surface 514, and a side surface 516. The front surface 514 faces or contacts the bottom wall 115 of the front cover 10. The rear surface 515 faces or contacts the bottom wall 212 of the rear cover 20. The side surface 516 faces or contacts the side wall 114 and side wall 213. The first and second electrode tabs 52 and 53 are disposed on the side surface 516.

Figure 6:
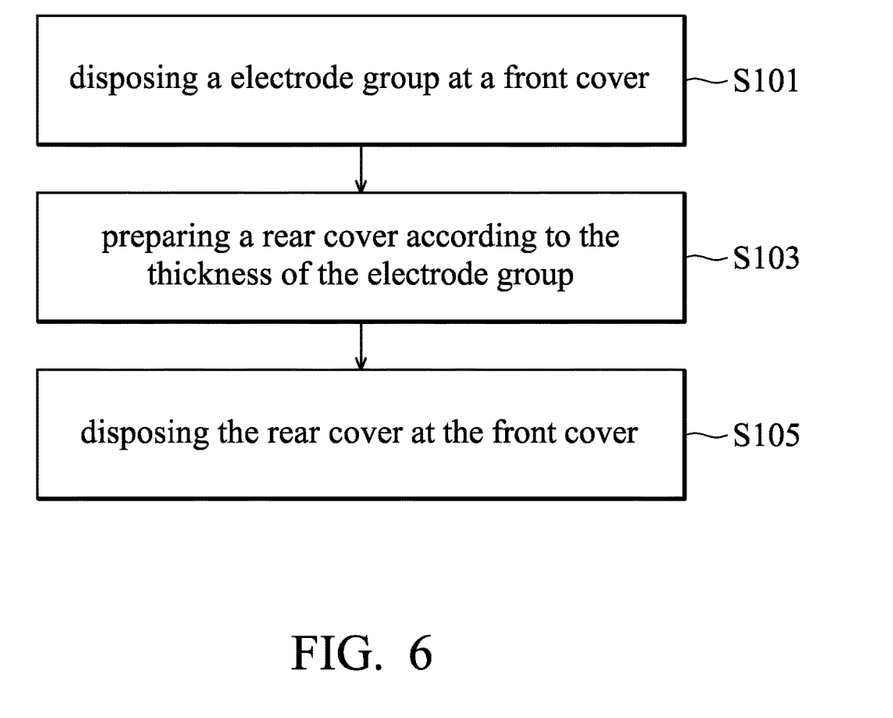
FIG. 6 is a flow chart of a manufacture method for a cell in accordance with the present disclosure.
Figure 7A:
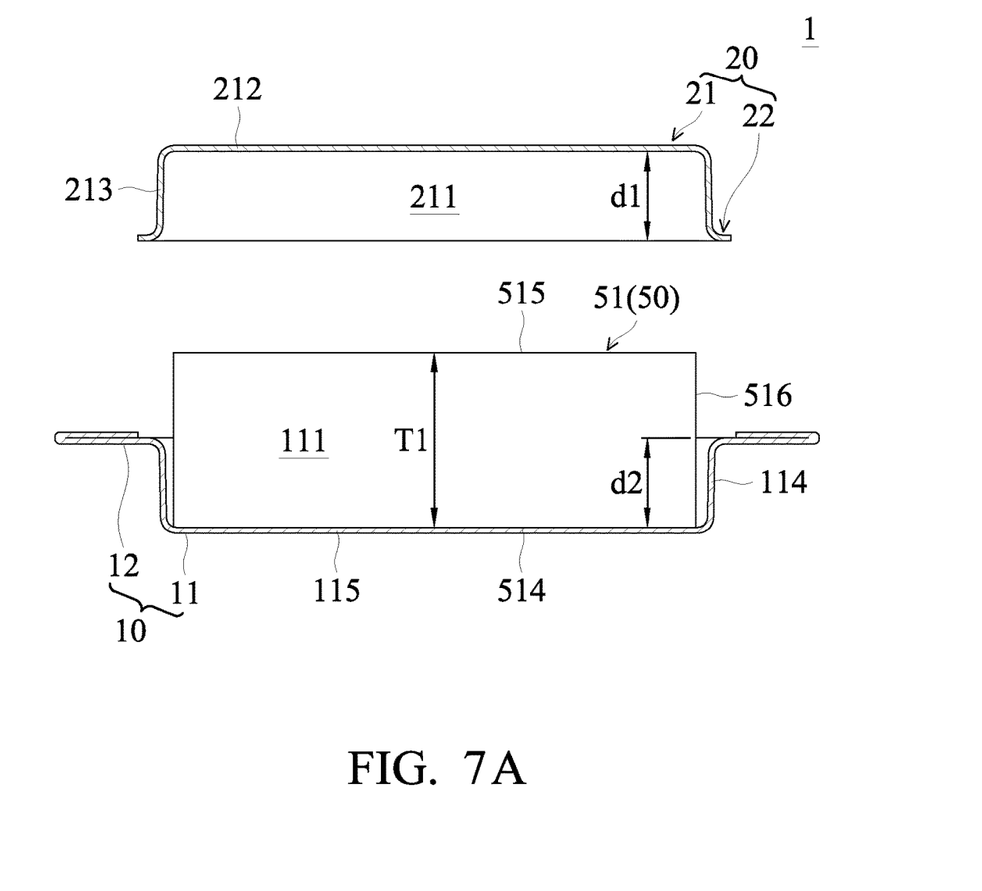
FIGS. 7A and 7B are cross-sectional views of the manufacturing method for a cell during intermediate stages.
Figure 7B:
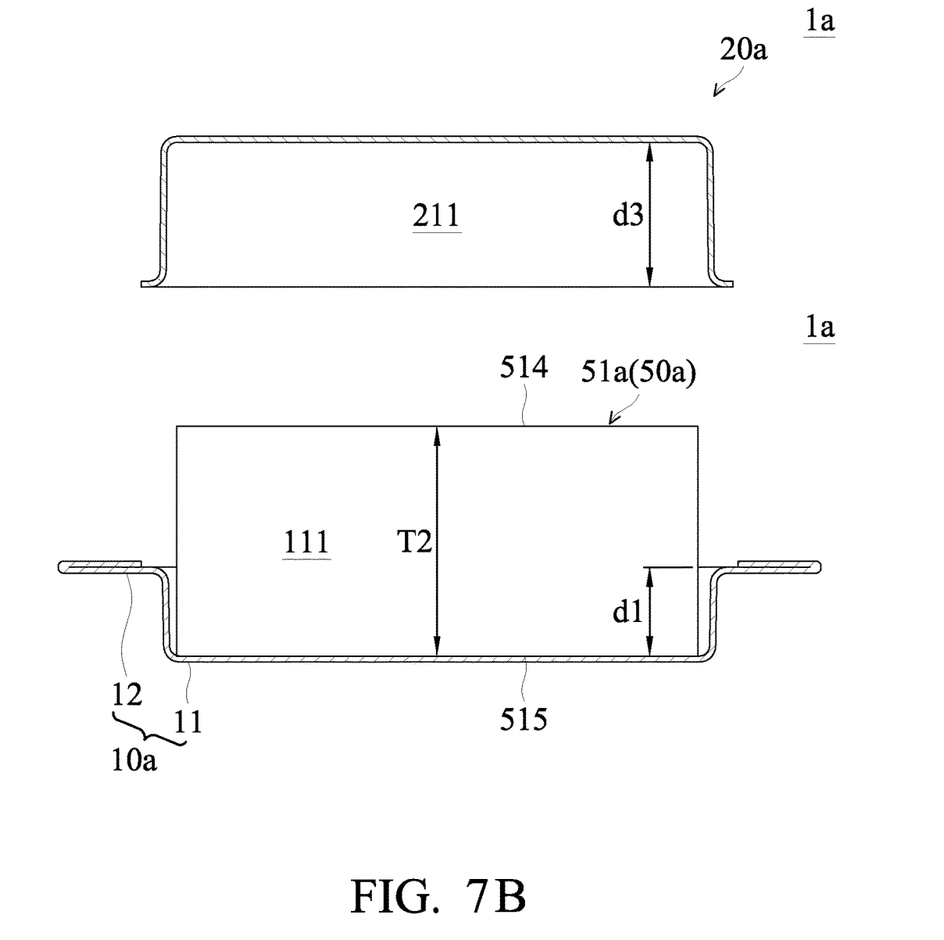

FIG. 6 is a flow chart of a manufacture method for a cell 1 in accordance with the present disclosure. FIGS. 7A and 7B are cross-sectional views of the manufacturing method for a cell 1 during intermediate stages. In step S101, as shown in FIG. 7A, the electrode group 50 is disposed at the front cover 10.

Furthermore, as shown in FIG. 4, when the electrode group 50 is disposed in the front cavity 111 of the front cover 10, the first electrode tab 52 is connected to the first terminal 30, and the second electrode tab 53 is connected to the second terminal 40. Therefore, since the electrode tabs 50 and 53 and terminals 30 and 40 are automatically connected when the electrode group 50 is disposed in the front cavity 111, the manufacturing time of the cell 1 is decreased.

In step S103, the rear cover 20 is prepared according to a thickness T1 of the cell body 51 of the electrode group 50. The thickness T1 is defined as the distance between the front surface 514 and the rear surface 515 of the cell body 51. The rear cavity 211 has a depth d1, and the depth d1 is determined according to the thickness T1. In some embodiments, the front cavity 111 has a depth d2. The depth d1 is smaller than the thickness T1, and the depth d2 is also smaller than the thickness T1. All of the cell body 51 is not completely located in the front cavity 111 or the rear cavity 211. Since the depth d1 and depth d2 is small, the manufacture of the front cover and the rear cover is simplified.

In some embodiments, the thickness T1 is sustainably equal to the depth d1 plus the depth d2. Therefore, the electrode group 50 can be covered by the front cover 10 and the rear cover 20. In other words, the front cover 10 and the rear cover 20 can be connected when the electrode group 50 is located in the front cavity 111 and the rear cavity 211.

In step S105, the rear cover 20 is disposed at the front cover 10. In some embodiments, the first rear cover 20 is fixed at the front cover 10 by welding as shown in FIGS. 5A and 5B.

As shown in FIG. 7B, another cell 1a is performed by the manufacture method of the present disclosure. An electrode group 50a is disposed at a front cover 10a. If the cell body 51a of the electrode group 50a has a thickness T2 different from (such as greater or lesser) the thickness T1, the rear cover 20a is prepared according to the thickness T2 of the electrode group 50a. In some embodiments, the rear cavity 211 has a depth d3, and the depth d3 is determined according to the thickness T2.

In some embodiments, the front cover 10 and the front cover 10a have the same structure, and thus some elements, such as the first terminal 30 and the second terminal 40 can be disposed on both the front cover 10 and the front cover 10a and have the same structure. The front cover 10 and the front cover 10a have the same depth d1. The thickness T2 is sustainably equal to the depth d1 plus the depth d3. Therefore, the electrode group 50a can be covered by the front cover 10a and the rear cover 20a.

In general, the depth of the rear cavity 211 corresponds to the height of the side wall 213 of the rear cover 20. Therefore, the manufacturing cost of cells 1 having different thickness (or electric capacity) is decreased by simply modifying the height of the side wall 213 of the rear cover 20 or the depth of the rear cavity 211.

In conclusion, the electrode group of the cell is covered by the front cover and the rear cover, and thus the manufacture of the front cover and the rear cover is easy. Furthermore, since the electrode group is connected to the terminals before the front cover is fixed at the rear cover, the manufacturing time of the cell is decreased. If the cell capacity of the cell is modified by design, only the height of the side wall of the rear cover may be modified to match the modification by design. Therefore, the manufacturing cost of the cell with different cell capacities is decreased.

Words such as "first" or "second" in the specification are for the purpose of clarity of description only, and are not relative to the claims or meet to limit the scope of the claims. In addition, terms such as "first feature" and "second feature" do not indicate the same or different features.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A cell, comprising:
    a front cover having a front cavity;
    a rear cover, connected to the front cover, having a rear cavity;
    a first terminal, disposed on the front cover, passing through the front cover to the front cavity;
    a second terminal, disposed on the front cover, passing through the front cover to the front cavity;
    an electrode group, disposed in the front cavity and the rear cavity, connected to the first terminal and the second terminal in the front cavity, wherein the electrode group comprises:
        a cell body;
        a first electrode tab, disposed on the cell body, connected to the first terminal; and
        a second electrode tab disposed on the cell body, connected to the second terminal; and
    a retaining frame configured to retain the cell body, having a first slot and a second slot, wherein the first terminal passes through the first slot to the first electrode tab, and the second terminal passes through the second slot to the second electrode tab.

2. The cell as claimed in claim 1, wherein a depth of the front cavity and a depth of the rear cavity are each less than a thickness of the electrode group.

3. The cell as claimed in claim 1, wherein the front cover comprises a front body and a fixture element extending from the front body, wherein the rear cover is fixed at the fixture element.

4. The cell as claimed in claim 3, wherein the front cover is fixed on a device by retaining the fixture element.

5. The cell as claimed in claim 3, wherein the fixture element has a fixture hole configured for a fastening mechanism passing through the fixture hole, and the front cover is fixed on a device by the fastening mechanism.

6. The cell as claimed in claim 3, wherein the rear cover comprises a rear body and a welding portion extending from the rear body, wherein the welding portion is fixed at the fixture element by welding.

7. The cell as claimed in claim 6, wherein the fixture element protrudes from an outer surface of a side wall of the front body, the welding portion protrudes from an outer surface of a side wall of the rear body, and the welding portion contacts a portion of the fixture element.

8. The cell as claimed in claim 6, wherein an area of the fixture element is greater than an area of the welding portion.

9. The cell as claimed in claim 1, wherein the rear cover comprises a rear body and a fixture element extending from the rear body, wherein the front cover is fixed at the fixture element.

10. The cell as claimed in claim 9, wherein the front cover comprises:

a front body and a welding portion extending from the front body, wherein the welding portion is fixed at the fixture element by welding.

11. The cell as claimed in claim 1, wherein the front body has a first hole and a second hole, and the first terminal passes through first hole, and the second terminal passes through the second hole.

12. The cell as claimed in claim 11, further comprising a first seal element configured to seal a gap between the first terminal and the front body, and a second seal element configured to seal a gap between the second terminal and the front body.

* * * * *